United States Patent

[11] 3,556,406

| [72] | Inventor | Henry C. King |
| --- | --- | --- |
| | | Hamilton, Mont. |
| [21] | Appl. No. | 845,597 |
| [22] | Filed | June 20, 1969 |
| | | Continuation-in-part of application Ser. No. 639,892, May 19, 1967, now abandoned. |
| [45] | Patented | Jan. 19, 1971 |
| [73] | Assignees | Elsie King |
| | | a part interest; |
| | | Donna F. King |
| | | Hamilton, Mont., a part interest |

[54] IRRIGATION SPRINKLER WITH PUMP PRIMING SYSTEM
14 Claims, 8 Drawing Figs.
[52] U.S. Cl. ................................................. 239/181, 103/113
[51] Int. Cl. ................................................. B05b 3/18
[50] Field of Search ........................................ 239/179, 181, 180, 184, 212; 103/22, 27, 113A

[56] References Cited
UNITED STATES PATENTS

| 2,718,433 | 9/1955 | Poynor et al ................. | 239/179 |
| 3,104,821 | 9/1963 | Anderson ..................... | 239/179 |

Primary Examiner—M. Henson Wood, Jr.
Assistant Examiner—Michael Y. Mar
Attorneys—Clarence A. O'Brien and Harvey B. Jacobson ABSTRACT: An automatic irrigation ditch traversing sprinkling apparatus provided with a power operated centrifugal pump means intaking water from the irrigation ditch for pressure discharge through a sprinkling head wherein the device is provided with a vacuum actuated pump priming means adapted to automatically maintain or reprime the centrifugal pump which apparatus includes control means for simultaneously stopping the traversing motion of the device during repriming so as to insure uniform distribution of water to an area being irrigated.

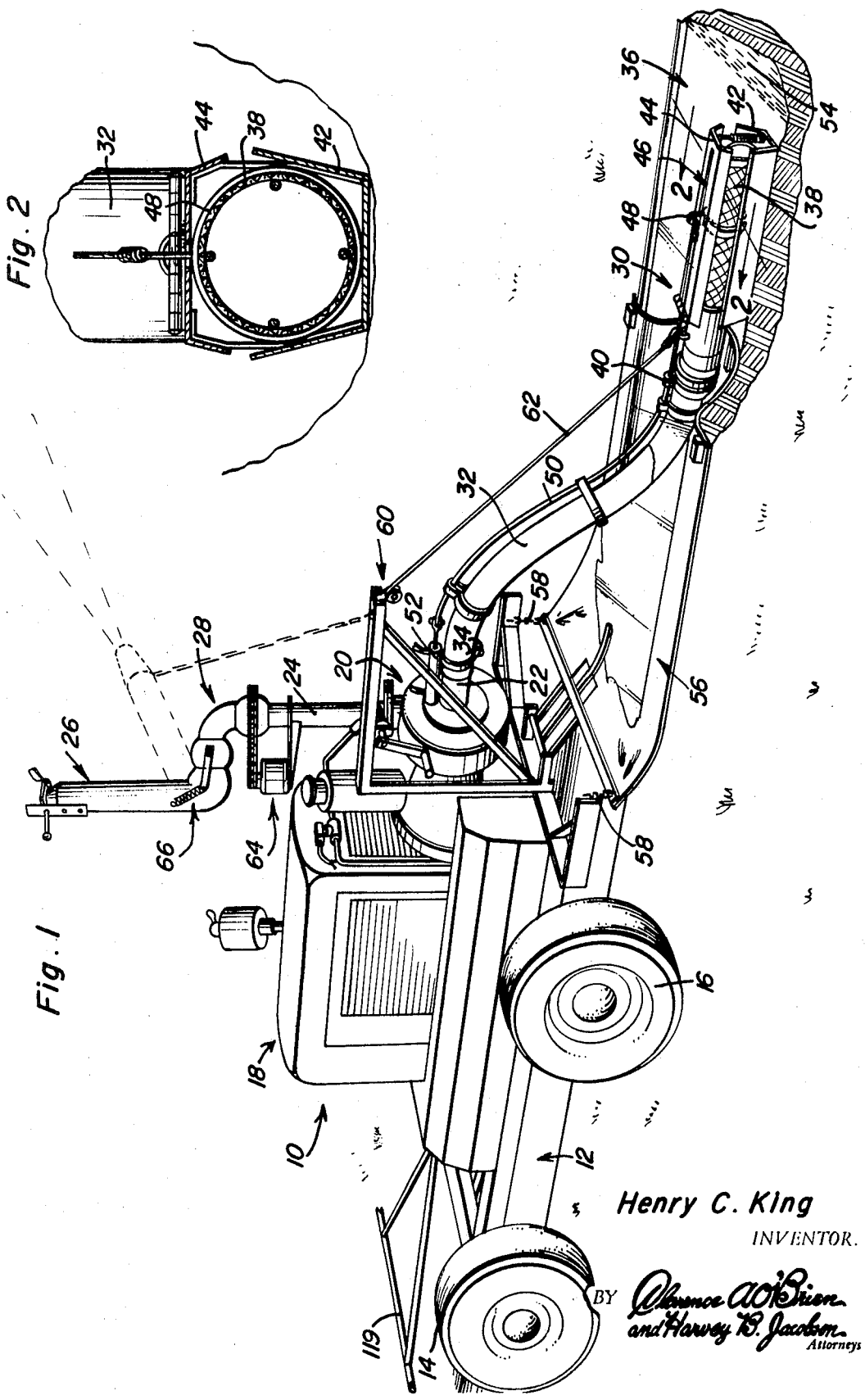

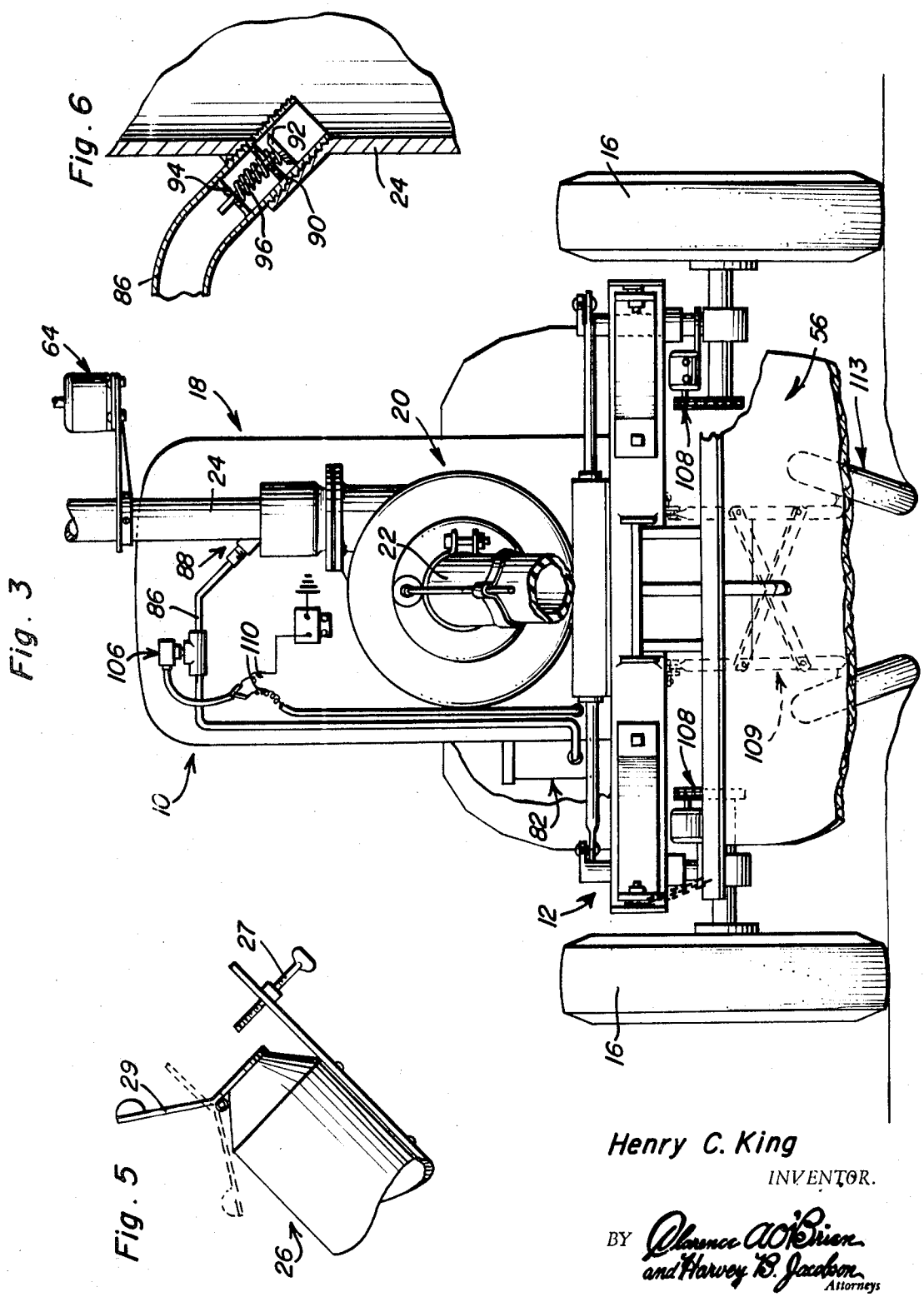

PATENTED JAN 19 1971
3,556,406
SHEET 3 OF 3
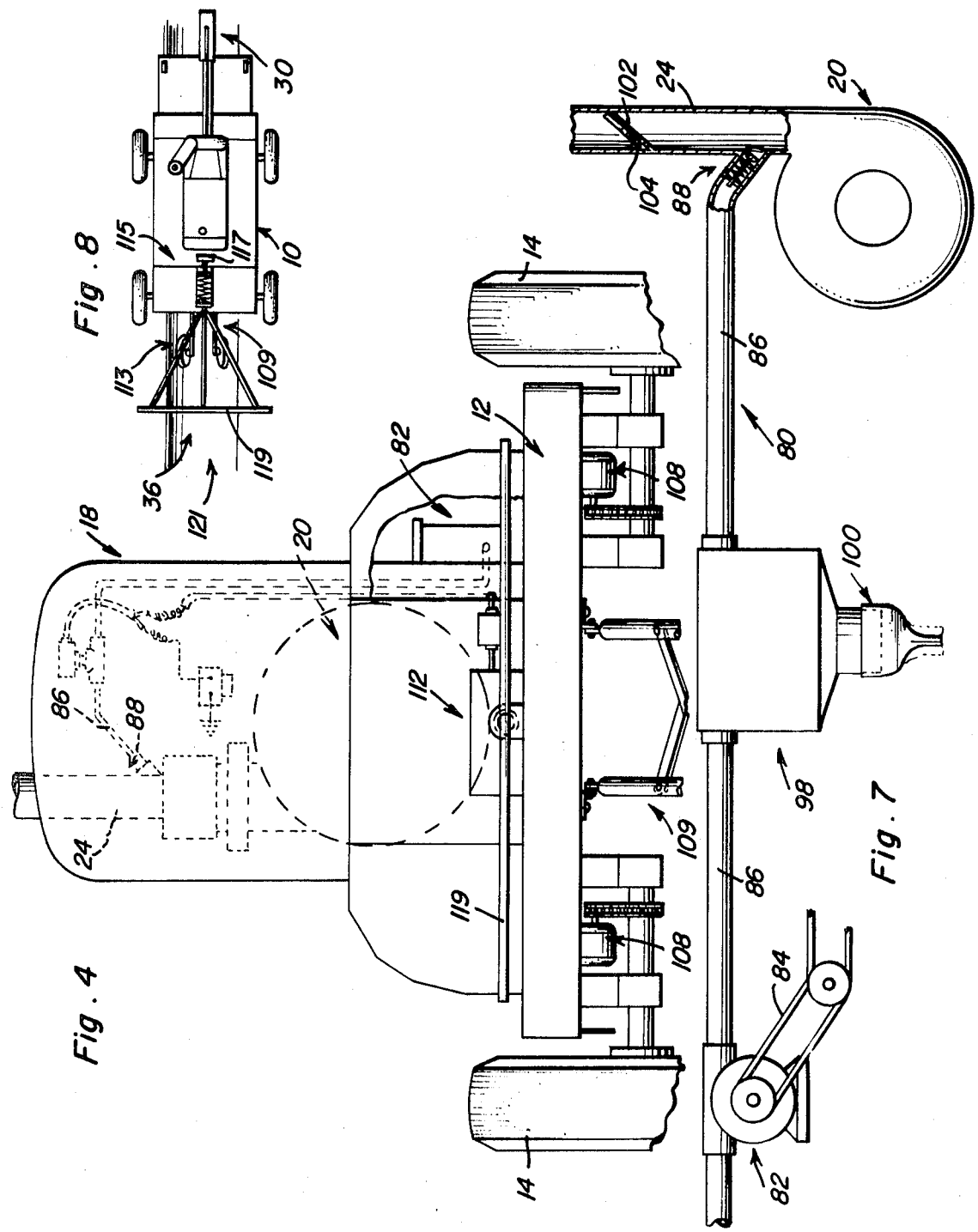
Henry C. King
INVENTOR.
BY *Clarence A. O'Brien*
*and Harvey B. Jackson*
Attorneys

3,556,406

IRRIGATION SPRINKLER WITH PUMP PRIMING SYSTEM

This case is a continuation of 639,892 filed May 19, 1967, now abandoned.

The present invention relates to in irrigation sprinkler of the type adapted to automatically traverse a water containing irrigation ditch, in straddling relation thereto, so as to automatically, in the absence of an attendant, intake water from the irrigation ditch and discharge it for a considerable distance to both sides thereof by means of a centrifugal pumping means. More particularly, the present invention relates to a power driven ambulatory irrigation sprinkler provided with a vacuum actuated pump priming means adapted to reestablish the prime of the centrifugal pump subsequent to the temporary absence of water in the irrigation ditch. More specifically, the present invention relates to the provision of a pump priming system for an irrigation sprinkler wherein the traversing action of the sprinkler is temporarily stopped during repriming of the centrifugal pump means so as to insure that the irrigation sprinkler, during an absence of water in the ditch, does not continue to traverse the field and thus not irrigate a portion thereof.

Power driven ambulatory irrigation sprinklers have been known heretofore. In my prior U.S. Pat. No. 2,880,937 issued Apr. 7, 1959, there is shown an irrigation sprinkler in the form of a self-propelled machine having means for receiving water from an irrigation ditch and distributing it over surrounding land in the absence of an operator. However, while such an irrigation sprinkler is highly satisfactory for operation in conjunction with an irrigation ditch to which a substantially constant supply of water is directed, it is somewhat less than satisfactory for use in conjunction with ditches provided with an irregular supply of water. Inasmuch as even in the absence of water in the ditch the irrigation sprinkler continues to traverse the ditch thereby failing to irrigate certain portions of the field.

It is therefore a primary object of the present invention to provide an improved construction for a power driven ambulatory irrigation sprinkler wherein the irrigation sprinkler is provided with a priming system adapted to automatically reprime a pump comprising a portion of the sprinkler subsequent to the temporary absence of water in the irrigation ditch.

Another object of the present invention is to provide an improved construction for an irrigation sprinkler with a pump priming system wherein the traversing action of the irrigation sprinkler will be temporarily halted in the absence of sufficient water in an irrigation ditch from which the sprinkler normally intakes water, so as to insure that irrigation water is uniformly applied to the land.

Still another object of the present invention is to provide an irrigation sprinkler of the aforementioned type provided with a pump priming system wherein in the absence of sufficient water to maintain the prime of the sprinkler pump a vacuum is applied to the pump discharge outlet to assist in creating a partial pressure so as to permit atmospheric pressure to act upon a renewed flow of water in the ditch to force it upwardly into the pump housing thereby effectively repriming the pump at which time communication between the discharge outlet of the pump and the vacuum priming means is blocked until such time as the pump again loses its prime.

Still another object of the present invention is to provide a power driven ambulatory irrigation sprinkler with pump priming system which incorporates a hydraulically actuated traversing and guiding system as well as hydraulically actuated means for preventing clogging of the water intake means for the sprinkler pump.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 is a perspective view of an exemplary embodiment of a power driven ambulatory irrigation sprinkler of the present invention, showing the irrigation sprinkler operatively straddling an irrigation ditch from which it derives water to be sprinkled;

FIG. 2 is an enlarged fragmentary vertical cross section view of a water intake means of the device of FIG. 1 taken substantially along the plane of the line 2–2 of FIG. 1;

FIG. 3 is an enlarged fragmentary rear elevational view of the device of FIG. 1;

FIG. 4 is an enlarged fragmentary front elevational view of the device of FIG. 1;

FIG. 5 is an enlarged detailed showing of an exemplary embodiment of a sprinkler head utilized in conjunction with the irrigation sprinkler of FIG. 1;

FIG. 6 is an enlarged detail showing of a priming check valve comprising a portion of the pump priming system utilized in conjunction with the device of FIG. 1;

FIG. 7 is a diagrammatic representation of an exemplary from of the pump priming system utilized in conjunction with a device of FIG. 1; and FIG. 8 is a top plan view, in reduced scale, of the device of FIGS. 1—4.

Referring now to the drawings in detail and FIG. 1 in particular, it will be seen that an exemplary embodiment indicated generally at 10 of a power driven ambulatory irrigation sprinkler constructed in accordance with the principles of the present invention comprises a wheeled frame means indicated at 12 provided with a plurality of pneumatic front and rear wheels 14 and 16 respectively individually actuated by hydraulic means to be described hereinafter. The wheel carrier 12 is provided with a primary power source indicated generally at 18, which in the embodiment illustrated comprises a diesel engine, although it will be appreciated of course that any suitable engine may be utilized.

A centrifugal pump means indicated generally at 20 is operatively associated with the output shaft, not shown, of the diesel engine 18. The centrifugal pump means 20 is of a conventional construction and includes a centrally disposed intake 22 and a tangential discharge 24 operatively connected to a sprinkler head indicated generally at 26 through a suitable selectively positionable double swivel joint elbow indicated at 28.

As seen best in FIG. 1, the sprinkler pump intake 22 is provided with a water intake means 30 including a flexible intake suction hose 32 having one end secured to the inlet 22 by a clamp 34. The hose 32 is sized so as to normally extend within an irrigation ditch such as indicated generally at 36. To prevent inadvertent intake of debris, such as rocks, sticks, etc. from the irrigation ditch 36 the water intake means 30 is further provided with a water intake screen assembly including a screen 38 having an imperforate portion adjacent one end to permit securing the hose 32 thereto such as by use of a clamp 40. The screen 38 is provided with a troughlike protector or skid member 42 secured to the underside of the screen 38 and a hingedly mounted upper portion 44 provided with a longitudinally elongated slot means 46 which provides a guide means for reciprocation of a screen scraping or cleaning element 48 which slidingly and scrapingly encompasses the screen 38 and is provided with an upstanding portion received in the slot means 46. The cleaning element 48 is selectively or automatically reciprocated through a flexible drive cable 50 such as is actuated by a double-acting hydraulic cylinder or the like 52 deriving its source of power from a conventional hydraulic pump means, not shown, which will be understood hereinafter is also utilized to hydraulically drive the wheels 14 and 16.

The irrigation sprinkler 10 as will be seen hereinafter automatically traverses the irrigation ditch 36 in the direction of the arrow as shown in FIG. 1 and water 54 flowing in the ditch 36 is dammed by a flexible dam means 56, such as of a water impervious flexible sheet, suspended by chains 58, for example, from the frame means 12 so as to depend downwardly into sealing engagement with the sides and bottom of the irrigation ditch 36 as the irrigation sprinkler 10 traverses the ditch 36.

Thus it will be seen that the water intake means 30 is normally submerged. During overland or over-the-road transporting of the irrigation sprinkler 10 the intake means 30 may be lifted clear of the ground by a manually actuated drum and cable winch means indicated generally at 60 and including a cable 62 having one end secured to the imperforate portion of the screen 38 and the other end secured to a suitable cable drum.

From the foregoing it will thus be appreciated that an irrigation sprinkler such as illustrated herein traverses an irrigation ditch such as 36 intaking water therefrom and discharging it through the sprinkler head 26 to the land on either side of the ditch 36 and preferably in a 360° arc such as by virtue of the double swivel joint elbow 28 provided with a sprinkler rotating means 64 such as comprising an electric motor rigidly mounted to the stationary nonrotatable sprinkler pump outlet 24. The rotating means 64 drives the swivel joint elbow 28 and its associated sprinkler head 26 360° deriving power from the generator system of the primary power source 18. The sprinkler head 26 may be selectively vertically positioned, at an angle to the horizontal such as between the full and phantom line positions shown in FIG. 1, and releasably retained in a selected position by a lever-spring tensioning assembly indicated generally at 66. As seen in FIGS. 1 and 5 the sprinkler head 26 is provided with a threadably adjustable spray-diffuser member 37 which may be adjusted into diffusing contact with the spray to adjust the pattern of the spray discharging from the sprinkler head 26. The sprinkler head 26 is further provided with a pivotally secured end cap 29 which during normal inclination of the sprinkler head, such as in the phantom line position in FIG. 1, normally pivots into the full line position shown in FIG. 5, to close off the outlet opening in the sprinkler 26 in the absence of water discharging therethrough under the influence of the pump 20, for reasons which will become clear hereinafter during discussion of the operation of the irrigation sprinkler 10.

Referring now to FIGS. 3, 4, 6 and 7 it will be seen that the irrigation sprinkler 10 includes a pump priming system 80, as schematically shown in FIG. 7, which includes a power operated vacuum pump means 82, of a conventional vane type powered such as by a suitable drive belt 84, or the like driving power from the primary power source 18 which vacuum pump 82 is operatively connected to the pump outlet 24 by a vacuum conduit 86 and having a priming check valve means 88 operatively interposed within conduit 86 and as best seen in FIG. 6 comprising a line conditioned responsive spring biased valve including a valve seat 90 and valve element 92 slidably mounted relative to the valve seat 90 by a spider 94 and normally biased into the open position shown in FIG. 6 by a helical spring 96 having one end in contact with the head of the valve member 92 and the other in contact with the spider 94. For reasons which will become apparent hereinafter, the spring 96 exerts sufficient force on the valve member 92 to normally maintain the valve member 92 spaced from the seat 90, as seen in FIG. 6, against the influence of a vacuum pump means 82 in the absence of pressurizing water in the outlet 24. The pump priming system 80 further includes a liquid trap means 98 interposed in the vacuum conduit 86 and adapted to receive liquid which enters the conduit 86, for reasons which will become clear hereinafter, and retain such liquid therein to prevent damage to the vacuum pump means 82. The trap means 98 includes an automatic drain means 100 such as comprising a duck-bill resilient valve member which continuously and intermittently drains liquid from the trap 98 as the pressure created by the weight of the liquid therein forces the lips of the drain means 100 from the full line closed position to the phantom line open position as seen in FIG. 7. The outlet conduit 24 is further provided with an outlet check valve means 102 pivotally secured as at 104 to the interior of the wall of the conduit 24 so as to normally rest, under the influence of gravity, in the position shown in FIG. 7 wherein the check valve 102 closes off the discharge outlet of the pump 20 from the atmosphere to permit the vacuum pump means 82 to draw water up into the pump 20, which would not be possible were the outlet conduit 24 open to the atmosphere.

As seen best in FIGS. 3 and 4, the vacuum conduit 86 is further provided with a pressure responsive switch means 106 operatively interposed therein which senses pressure within the line 86 and as will become clear hereinafter during discussion of the operation of the irrigation sprinkler 10 controls a throttle means comprising a portion of the primary power source 18, a hydraulic pump means operatively associated with individual hydraulic drive means 108 operatively associated with each of the wheels 14 and 16 and the hydraulically reciprocated intake screen cleaning means. The pressure responsive valve 106 is operatively connected to the throttle and hydraulic pump means by suitable electrical wires 110 for example.

Referring now to the operation of the irrigation sprinkler 10 it will be appreciated that the device is placed in straddling relation to the irrigation ditch 36 with a guide wheel means 109 including a pair of forwardly disposed laterally adjustable guide wheels 113, riding within the ditch. The guide wheel means 109 is connected to a hydraulic control means indicated generally at 112 receiving fluid under pressure from the hydraulic pump mentioned above and selectively distributing the fluid to the individual hydraulic drive motors 108 to drive the front wheels 14 at a uniform rotational speed and the back wheels 16 at a generally uniform rotational speed except when one rear wheel 16 overspeeds relative to the other rear wheel 16 to assist in steering the irrigation sprinkler 10 to maintain it in straddling relation to the ditch 36 as it traverses the ditch 36 guided by the guide wheels 113. The forward travel of the irrigation sprinkler 10 is however also under the control of the pressure responsive control switch 106 inasmuch as when water taken into the intake means 30 by the pump 20 is being discharged through the outlet conduit 24 and the sprinkler 26 the valve member 92 is sealingly seated in the valve seat 90 of the valve 88 thereby effectively blocking off the vacuum conduit 86 from the conduit 24 whereby the vacuum pump means 82 will subject the control switch 106 to a relatively greater vacuum pressure than would normally be possible were the valve 92 shown in the position of FIG. 6. When such conditions exist it will be under stood that the throttle and hydraulic pump controls operatively associated with the electrical conductors 110 will maintain the primary power source at its normal operating r.p.m. and the hydraulic pump means pumping its normal output to supply fluid under pressure to the hydraulic motors 108 driving the wheels 14 and 16. It will further be appreciated that this is only possible when the water intake means 30 is receiving water from within ditch 36 because when the level of the water 54 in the ditch 36 drops sufficiently so that the pump 20 loses its prime and water is no longer discharged through the outlet 24 and sprinkler 26 the valve member 92, under the influence of spring 96, will move from its sealingly seated position in valve seat 90 to the open position shown in FIG. 6 whereby the interior of the conduit 24 will be communicated with the vacuum pump means 82. Simultaneously the pressure decreases in the conduit 24 due to the rush of air therethrough will actuate the responsive valve 106 to cause the primary power source 18 to throttle back and the hydraulic pump means to stop thereby arresting travel of the irrigation sprinkler 10 until such time as the vacuum pump 82 draws sufficient water into the pump 20 to regain its prime and resume sprinkling, at which time the valve member 92 again sealingly seats in the valve body 90 thus repeating the operation indicated hereinabove. In the absence of water passing through the conduit outwardly through the conduit 24 to the sprinkler 26 the valve 102 will sealingly seat the position shown in FIG. 7 so as to insure that the vacuum pump means 82 draws water through the water intake means 30 and not air through the sprinkler 26. It will thus be seen that the liquid trap means 98 is provided to trap incidental amount of water which may inadvertently pass into the vacuum conduit 86 at the moment when the pump 120 regains its prime and before the valve member 92 sealingly seats in the valve body 90.

The engine 18 is provided with a suitable ignition grounding wire, fuel supply cutoff solenoid lead, or the like 115 which when grounded will cutoff the engine 18 and thus stop it. In order that the grounding wire may be grounded to the frame 12, there is provided a spring biased normally open switch 117 mounted on the frame 12. In order to control the operation of the switch, there is provided a forwardly biased switch operating means carried by the frame 12 and including a transverse bar 119 of a width to extend at least the width of the widest ditch to be encountered. At the point it is desired to stop the movement of the irrigation sprinkler 10, there is removably driven, within the ditch 36, a suitable rod 121. The rod 121 is engaged by the transverse bar 119 which moves rearwardly to actuate the switch 117 and ground the ignition, etc. of the engine 18 to stop it.

From the foregoing, it will be readily apparent that the irrigation sprinkler 10 of the present invention is capable of automatically traversing an irrigation ditch and sprinkling the land adjacent thereto with virtually no attendance by an operator, other than initial starting, by virtue of the fact that it will continue down the ditch sprinkling as long as water is available and when the pump 20 loses its prime it will arrest travel of the device 10 until such time as the prime is regained at which time the device 10 will resume its travel along the ditch thereby assuring that substantially all areas under irrigation will receive a relatively uniform application of irrigation water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination with an irrigation sprinkler for traversing an irrigation ditch and including a power operated sprinkler pump means having an inlet means for receiving water from the irrigation ditch and a discharge outlet means for delivering water to a sprinkler means, a pump priming system operatively connected to said sprinkler pump means to prime said sprinkler pump means, said priming system including a power operated vacuum pump means, valve means for closing off the discharge outlet means.

2. In combination with an irrigation sprinkler for traversing an irrigation ditch and including a power operated sprinkler pump means having an inlet means for receiving water from the irrigation ditch and a discharge outlet means for delivering water to a sprinkler means, a pump priming system operatively connected to said sprinkler pump means to prime said sprinkler pump means, said priming system comprising a power operated vacuum pump means, an outlet check valve means for closing off the discharge outlet means from the atmosphere in the absence of water being supplied to said sprinkler means, vacuum conduit means operatively connecting an intake of said vacuum pump means with said sprinkler pump means to draw water into said sprinkler pump means under the influence of a partial pressure created in said sprinkler pump means by said vacuum pump means whereby said sprinkler pump means will be primed, said priming system including a priming check valve means operatively interposed in said vacuum conduit means between said sprinkler pump means and said vacuum pump means, said priming check valve being adapted to be actuated.

3. The combination of claim 2 wherein said priming check valve means comprises a spring-biased normally open line condition responsive check valve means having a valve element adapted to be sealingly seated in response to pressure exerted by water being supplied by said sprinkler pump means to said sprinkler means, whereby said vacuum conduit means will be operatively disconnected from said sprinkler pump means when said sprinkler pump means does not require priming.

4. The combination of claim 3 wherein said spring-biased normally open line condition responsive check valve means is provided with a biasing spring adapted to maintain the valve open against the influence of a partial pressure created by said vacuum pump means in the absence of water being delivered to said sprinkler means by said sprinkler pump means.

5. The combination of claim 1 wherein said conduit means includes a liquid trap means adapted to prevent noncompressible liquids which enter said vacuum conduit means from reaching said vacuum pump means.

6. The combination of claim 1 wherein said liquid trap means includes an automatic drain means adapted to continuously and intermittently drain liquid collected by said trap means.

7. In combination with an irrigation sprinkler for traversing an irrigation ditch and including a power operated sprinkler pump means having an inlet means for receiving water from the irrigation ditch and a discharge outlet means for delivering water to a sprinkler means, a pump priming system operatively connected to said sprinkler pump means to prime said sprinkler pump means, said priming system comprising a power operated vacuum pump means, an outlet check valve means for closing off the discharge outlet means from the atmosphere in the absence of water being supplied to said sprinkler means, vacuum conduit means operatively connecting an intake of said vacuum pump means with said sprinkler pump means to draw water into said sprinkler pump means under the influence of a partial pressure created in said sprinkler pump means by said vacuum pump means whereby said sprinkler pump means will be primed, irrigation sprinkler guiding and traversing control means adapted to automatically guide said irrigation sprinkler along the irrigation ditch and arrest travel of said irrigation sprinkler in the absence of sufficient water in the ditch to maintain the prime of said sprinkler pump means, said control means including a pressure sensing means operatively associated with said vacuum conduit means and adapted to sense the loss of pump prime, said pressure sensing means being operatively associated with a power operated drive means of said irrigation sprinkler to arrest travel of said irrigation sprinkler in the absence of prime of the sprinkler pump means.

8. The combination of claim 7 wherein said priming system includes a priming check valve means operative interposed in said vacuum conduit means between said sprinkler pump means and said vacuum pump means, said priming check valve being adapted to be actuated in the absence of water being supplied to said sprinkler means to draw priming water from the irrigation ditch into said sprinkler pump means.

9. The combination of claim 7 wherein said priming check valve means having a valve element adapted to be sealingly seated in response to pressure exerted by water being supplied by said sprinkler pump means to said sprinkler means, whereby said vacuum conduit means will be operatively disconnected from said sprinkler pump means when said sprinkler pump means does not require priming.

10. The combination of claim 9 wherein said spring-biased normally open line condition responsive check valve means is provided with a biasing spring adapted to maintain the valve element open against the influence of a partial pressure created by said vacuum pump means in the absence of water being delivered to said sprinkler means by said sprinkler pump means.

11. The combination of claim 7 wherein said guiding and traversing control means includes a guide wheel means carried by said irrigation sprinkler and adapted to contact the ditch being traversed, and a stop means for said irrigation sprinkler, said stop means including a control switch, a forwardly extending actuator for said switch, said actuator projecting forwardly of the remainder of the irrigation sprinkler and terminating in a transverse member adapted to engage an abutment which may be placed in the irrigation ditch to shut off said irrigation sprinkler.

12. In an irrigation sprinkler including a power operated pump means having an inlet means for receiving water from an irrigation ditch as the sprinkler traverses the irrigation ditch and a discharge means for delivering water to a sprinkler means and a power operated drive means to drive the sprinkler along the irrigation ditch, control means operatively associated with said drive means for controlling travel of the sprinkler along the irrigation ditch, said drive control means including a pressure sensing means actuated by the pressure of the water being discharged to control travel of the sprinkler.

13. In an irrigation sprinkler including a power operated pump means having an inlet means for receiving water from an irrigation ditch as the sprinkler traverses the irrigation ditch and a discharge means for delivering water to a sprinkler means and a power operated drive means to drive the sprinkler along the irrigation ditch, control means operatively associated with said drive means for controlling travel of the sprinkler along the irrigation ditch, said control means including a pressure sensing means operatively associated with said pump means to control travel of the sprinkler in response to variations in water pressure in the discharge means of the pump means, said sensing means including a pressure sensing means operatively associated with the discharge means and drive means to control the drive means in response to variations in water pressure in the discharge means of the pump means, said pump means including a vacuum priming system communicated with the discharge means for the pump means, said pressure sensing means being operatively associated with said vacuum priming system to sense when the pump means is maintaining a predetermined water pressure in the discharge means and when a predetermined water pressure is not being maintained in the discharge means, said power operated drive means including a power source having a throttle control, said pressure sensing means being operatively associated with the throttle control to reduce the output of the power source without stopping the power source when a predetermined water pressure is not being maintained by the pump means and increase the output of the power source when the predetermined water pressure is again being maintained by the pump means in the discharge means.

14. The structure as defined in claim 13, wherein said vacuum priming system includes a vacuum pump, valve means communicating the vacuum pump with the discharge means, said valve means being retained in closed position by a predetermined water pressure in the discharge means and being openable in response to reduction in water pressure in the discharge means to communicate the discharge means with the vacuum pump for priming the power operated pump means.